April 25, 1967 S. P. D'AMICO 3,316,548
AUTOMATIC RADAR TRACKING SYSTEM

Filed Nov. 1, 1965 3 Sheets-Sheet 1

INVENTOR.
SALVATORE P. D'AMICO
BY

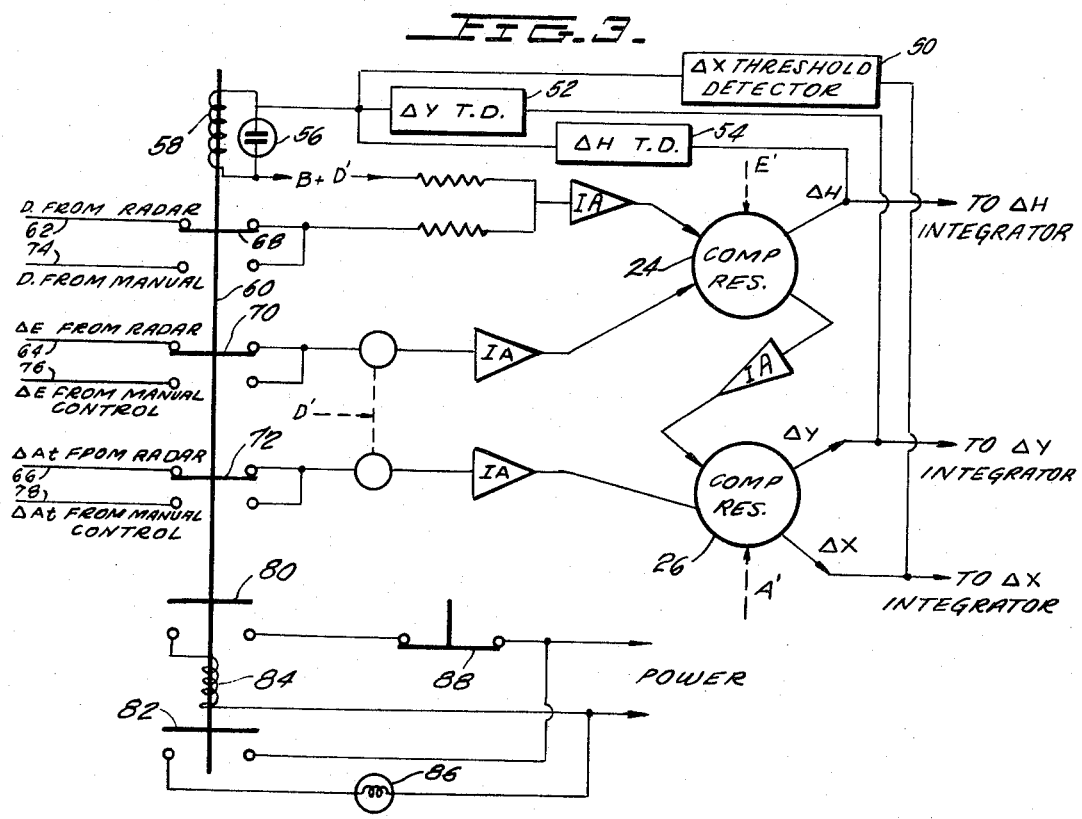
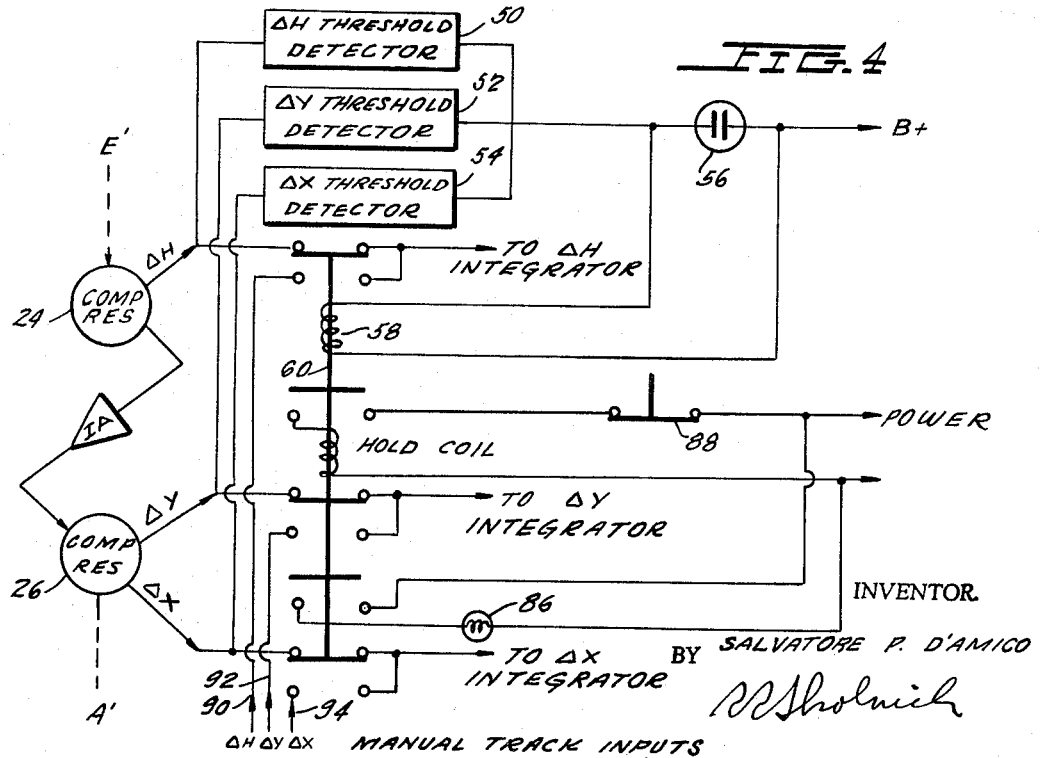

April 25, 1967   S. P. D'AMICO   3,316,548
AUTOMATIC RADAR TRACKING SYSTEM
Filed Nov. 1, 1965   3 Sheets-Sheet 3
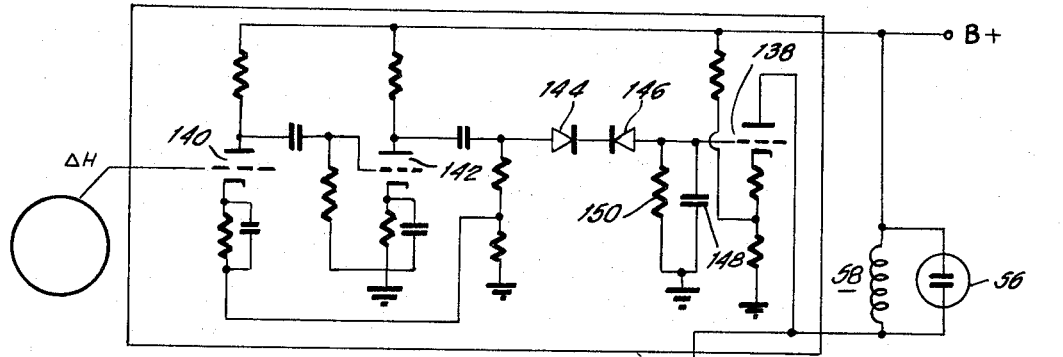
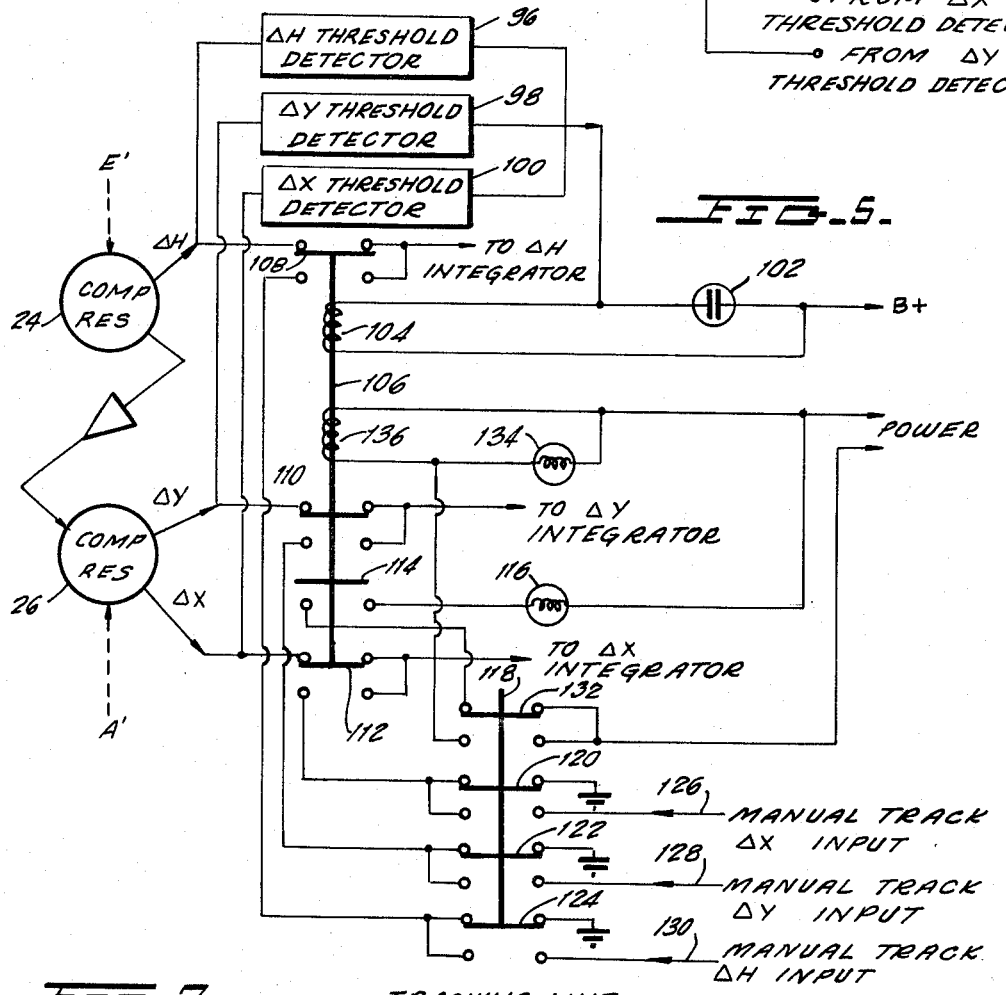
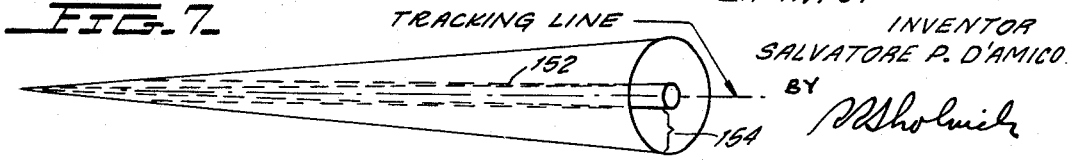
INVENTOR
SALVATORE P. D'AMICO
BY ID# United States Patent Office 3,316,548
Patented Apr. 25, 1967

3,316,548
AUTOMATIC RADAR TRACKING SYSTEM
Salvatore P. D'Amico, Huntington, N.Y., assignor to Sperry Rand Corporation, Ford Instrument Company Division, Long Island City, N.Y., a corporation of Delaware
Filed Nov. 1, 1965, Ser. No. 505,875
21 Claims. (Cl. 343—7.4)

This invention relates to automatic radar tracking systems and more particularly to an improved automatic radar tracking systems which is capable of providing an indication of the presence of undesirable or spurious returns before the automatic tracking system has operated on the spurious return and offset the correct tracking line.

A paramount deficiency of automatic radar tracking systems of the prior art is their inability to retain a tracked target in the presence of other objects within the range gate and beam width of the radar. That is, the radar system is not capable of discriminating between the desired return of the target being tracked and returns from other sources, which results in the radar either shifting from the target being tracked to the undesired source of return, settling at some point between the returns, or continually shifting from one to the other. Any one of these three possibilities is, of course, highly undesirable from the point of view of accurate radar tracking.

In view of this problem, the instant invention provides an indication of the presence of an undesirable return before the automatic tracking system has operated on this return to offset the proper tracking line. Such an indication is used to open the automatic tracking loop and drop the system into either a manual tracking mode or a coast mode in which the generating system generates a predicted target course based on the actual target motion prior to the instant of undesirable return indication. Thus when there is another object within the vicinity of the target being tracked, the selected target can be kept on the radar tracking line either manually or automatically, depending on the target flight path.

The proposed indication of undesirable return is based on a knowledge of the physical size and acceleration capabilities of the target being tracked. That is, in the present system the antenna positioning mechanism is responsive to an error signal (developed between two successive receptions by the antenna) which is dependent upon the acceleration of the target being tracked. Since achievable target accelerations are limited and known for a particular target, an error signal indicating an acceleration beyond the known capability of the target being tracked, provides an indication of extraneous and undesirable radar return.

Once the indication of undesirable return has been observed (indicating the presence of another object within the range and width of the radar beam) the tracking system of the instant invention automatically performs in one of two possible modes of operation.

In the first mode of operation, upon detection of undesirable return, the system drops out of the automatic tracking loop and becomes responsive to an error signal developed during manual operation. Thus the error inputs to the antenna positioning mechanism are those resulting from manual operation; and therefore, the operator can manually track the target while the second object is in the radar beam. When the second object disappears, the undesirable return indicator is extinguished; and the system can be returned to the automatic tracking loop.

In the second mode of operation, the system drops out of the automatic tracking loop, and the antenna position is changed at a rate of change which corresponds to the error signal received immediately prior to the undesirable return indication. Thus, if the target happens to be flying in a straight line path at constant speed (no acceleration) during the period that the second object is within the radar beam, the antenna will unknowingly follow the desired target. When the second object disappears, the undesirable return indicator is extinguished; and the system then drops back into its automatic tracking loop. If the target has not accelerated, the radar beam will be exactly on line with the target. If such is not the case, because the target has accelerated during the period that the antenna was coasting, the system may be manually operated, as discussed above, to bring the target back in line, and then returned once again to its automatic tracking loop.

Accordingly, it is an object of the instant invention to provide a radar tracking system capable of indicating the presence of undesirable return.

It is another object of the instant invention to provide a radar tracking system capable of indicating the presence of another object within the range and width of the radar beam.

Another object of the instant invention is to provide a radar tracking system which is capable of indicating the presence of undeisrable return before the system has operated on the return and offset the tracking line.

Still another object of the instant invention is to provide a radar tracking system in which the antenna positioning mechanism thereof is responsive to an error signal indicative of the acceleration of the target being tracked.

Another object of the instant invention is to provide a radar tracking system which includes a threshold device responsive to a predetermined magnitude of acceleration of a target being tracked for preventing the system's antenna positioning mechanism from automatically changing the position of the antenna in response to an acceleration greater than the predetermined magnitude.

Yet another object of the instant invention is to provide such a radar tracking system which includes a circuit arrangement whereby the system's positioning mechanism becomes responsive to a manually derived error signal when the threshold device has received an error signal of greater magnitude than the predetermined magnitude.

Another object of the instant invention is to provide such a radar tracking system which includes a circuit arrangement whereby the system's antenna positioning mechanism automatically changes the position of the antenna at a rate of change corresponding to that existing immediately prior to activation of the threshold device.

Other objects and a fuller understanding of the invention may be had by referring to the following description and claims, taken in conjunction with the accompanying drawings in which:

FIGURE 3 is a schematic diagram of an embodiment of the instant invention in which the radar tracking system changes from automatic tracking to manual polar tracking upon indication of undesirable return.

FIGURE 4 is a schematic diagram of an alternative embodiment of the invention of FIGURE 3 in which the radar tracking system changes from automatic tracking to manual rectangular tracking upon indication of undesirable return.

FIGURE 5 is a schematic diagram of an alternative embodiment of the instant invention in which the radar tracking system changes from automatic tracking to predicted tracking upon indication of undesirable return.

FIGURE 6 is a detailed schematic diagram showing the threshold detectors of FIGURES 3, 4, and 5.

FIGURE 7 is a diagrammatic sketch of the effective limits of the tracking system of the instant invention.

Figure 1:
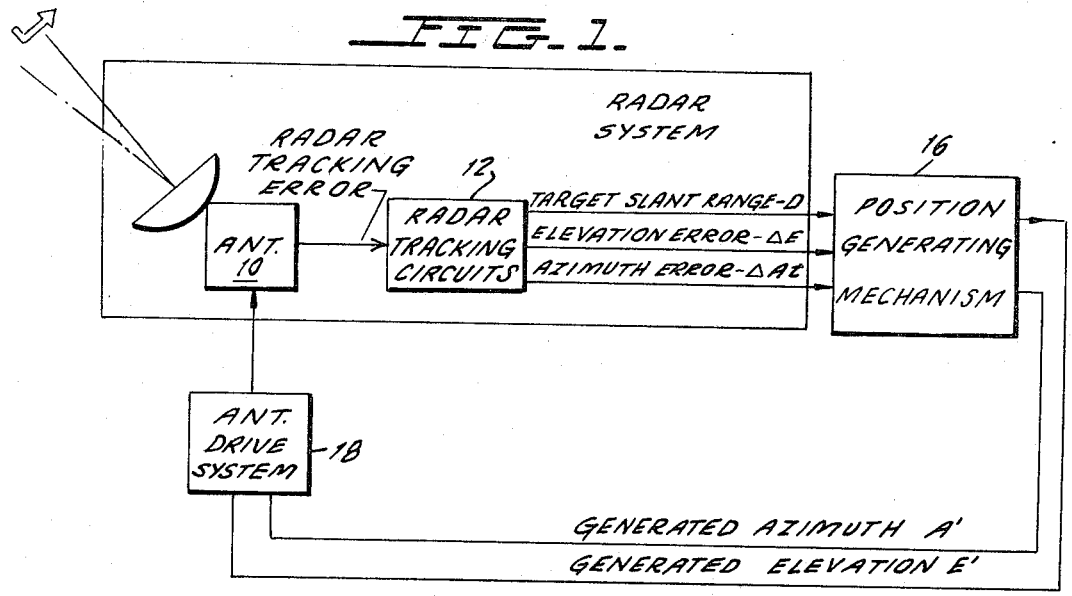
FIGURE 1 is a schematic diagram of an automatic radar tracking system in which the instant invention finds application.

Referring to FIGURE 1, there is shown an automatic radar tracking system in which the instant invention may find application. The system comprises an antenna 10 for conveying radar tracking error (in the form of a signal developed between two successive receptions) to the radar tracking circuits 12, which circuits resolve the error signal into a target slant range D, elevation error $\Delta E$ and azimuth error $\Delta A_t$. The system described thus far is a common radar system, well known in the art, and forms no part of the instant invention. For the purposes of this disclosure, it is sufficient to note that when the antenna 10 is not pointing directly at the target being tracked, the difference between two return pulses will present an error signal indicating the improper direction. The error signal is then resolved by the radar tracking circuits 12 which then present the coordinate errors of the tracking system.

As shown in FIGURE 1, these coordinate errors are the inputs to a position generating mechanism 16 which functions to produce a generated or predicted azimuth A' and elevation E' which in turn change the position of the antenna to the new predicted position by means of the antenna drive system 18. The antenna drive system 18 may be any suitable electromechanical device available in the art.

Figure 2:
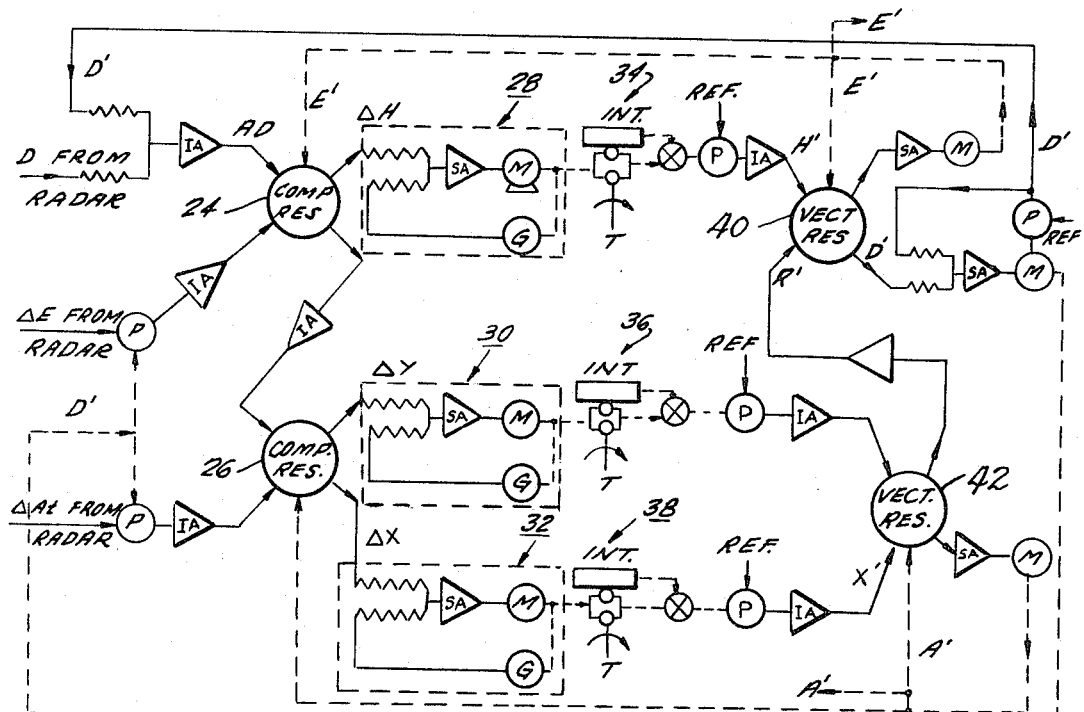
FIGURE 2 is a schematic diagram of the antenna positioning mechanism of FIGURE 1.

In FIGURE 2 there is shown a detailed schematic diagram of the position generating mechanism 16 of FIGURE 1. The inputs to this mechanism are derived from the radar and consist of, D, target slant range, $\Delta E$, the elevation error and, $\Delta A_t$, the azimuth error. The outputs of the mechanism are, D', generated target slant range, A', generated target azimuth and, E', generated target elevation. Range, azimuth and elevation errors are coordinate transformed by means of components resolvers 24 and 26 to yield $\Delta H$, $\Delta Y$, and $\Delta X$ which are the rectangular coordinate tracking errors. These errors are double integrated via electrical integrators 28, 30, and 32 and mechanical integrators 34, 36, and 38. The outputs of the integrators are then vector resolved in 40, 42 to yield D', E' and A'. A' and E' excite the antenna drive system 18 and close the tracking loop.

It is readily apparent that the rectangular coordinate system (H, Y and X) described is a Type 2 servomechanism (double-integration).

In such a system a constant error signal under steady state conditions produces a constant acceleration of the controlled variable. Such a system has a velocity constant ($K_v$) of infinity and is able to maintain a load speed with zero error.

The rectangular coordinate tracking errors $\Delta X$, $\Delta Y$ and $\Delta H$ are proportional to the coordinate accelerations of the target being tracked. Since achievable target accelerations are limited and known, an indication above the possible maximum mangitudes of $\Delta X$, $\Delta Y$ and $\Delta H$ will indicate extraneous and undesirable radar returns.

To illustrate, consider the system in automatic track of a straight line, constant speed target with $\Delta X$, $\Delta Y$ and $\Delta H$ equal to zero (no acceleration), and the sudden appearance of a second target. This second target in the range annd width of the radar beam will result in an instantaneous increase of the radar tracking error, and the output of the component resolvers 24, 26 will instantaneously indicate the coordinate acceleration errors of the second target. If these errors were allowed to persist, they would eventually cause the system to shift from the target it was tracking, and either settle at some point between the two or oscillate between the two. However, if, at the instant of appearance of the acceleration errors of the second target, the system were to drop out of automatic track into a coast or manual track mode, the radar could be kept on the initial target.

The instant invention contemplates two methods for accomplishing this operation. The first is shown in FIGURES 3 and 4, wherein the system is dropped from automatic tracking into a manual mode of operation, and the second is shown in FIGURE 5 wherein the system is dropped into a coasting operation.

Referring to FIGURE 3, the output of the component resolvers 24, 26 is monitored by the $\Delta X$, $\Delta Y$, and $\Delta H$ threshold detectors 50, 52, and 54 respectively. When the output reaches a threshold level, predetermined for the target being tracked, in any one of the coordinates, the threshold detector for that coordinate is energized. Output from any one of the threshold detectors energizes an excess acceleration indicator 56 and a coil 58 which drops the relay 60 from a first position, wherein the inputs 62, 64, 66 to the component resolvers 24 and 26 are directly from the radar tracking circuits 12, to a second position wherein the contacts 68, 70, and 72 cause the component resolvers 24 and 26 to become responsive to errors generated during manual polar control (indicated by the inputs 74, 76, 78). Movement of contacts 80 and 82 to their second position energizes the holding coil 84 and the manual control indicator 86. The radar operator can now track the desired target manually.

When the disturbing target disappears, the excess acceleration indicator 56 is extinguished, the coil 58 is de-energized, and the operator has only to press and release the switch 88 which de-energizes the holding coil 84 and allows the relay 60 to return to its first position wherein the radar tracking system is again functioning in the automatic tracking mode.

FIGURE 4 is similar to FIGURE 3 except that the manual track inputs 90, 92, and 94 are rectangular coordinates. The same numerals are used to indicate similar elements. The operation of FIGURE 4 is identical to that of FIGURE 3 and thus will not be repeated in detail. It is sufficient to note that upon reception of an error signal greater than the predetermined maximum for the target being tracked, the threshold detectors 50, 52 and/or 54 cause the relay 60 to move to its second position and thus make the position generating mechanism responsive to the manual track inputs 90, 92, 94. When the second target disappears, the relay is returned to its first position and the radar tracking system is thus returned to its automatic tracking mode.

In FIGURE 5 is shown the system for transforming the automatic radar tracking system into its coast mode of operation. This is a mode of operation in which the position generating mechanism changes the position of the antenna at a rate of change corresponding to the target velocity existing immediately prior to the reception of an undesirable return indication. Specifically, it will be seen that the component resolvers 24 and 26 are monitored by the threshold detectors 96, 98, and 100 which are similar to the detectors 50, 52, and 54 of FIGURES 3 and 4. Upon reception of an acceleration error signal greater than the predetermined magnitude for the target being tracked, one or more of the threshold detectors actuates the excess acceleration indicator 102 and coil 104. Coil 104 causes relay 106 to be dropped to its second position wherein the contacts 108, 110 and 112 cause the inputs to the integrators 28, 30 and 32 of the position generating mechanism 16 to be grounded. Movement of contact 114 to its second position energizes generated track indicator 116 to provide a visual indication that the system is in its "coasting" mode. The system, now responsive to a zero acceleration error signal (i.e., ground potential), then continues to generate a straight line target course based on the target velocity at the instant prior to excess acceleration indication. If the system had initially been tracking a constant speed, straight line target, the generating mechanism would then continue to follow this flight path.

When the disturbing target disappears, the coil 104 is de-energized; and the system is returned to automatic tracking. Should the generated course not coincide with the actual target course (because of an unknown change in acceleration of the target) the operator merely presses and holds relay 118 in its second position in which the contacts 120, 122 and 124 make the position generating mechanism responsive to the manual track inputs 126, 128 and 130. Movement of contact 132 to its second position energizes the manual track indicator 134 and also maintains relay 106 in its second position by means of holding coil 136 so that the inputs 126, 128, 130 may pass through contacts 108, 110, 112. The operator can now pick up the target manually; and assuming that the excess acceleration indicator 102 is extinguished, he can then drop the system back to automatic tracking by releasing the relay 118 which deenergizes holding coil 136 and allows relay 106 to return to its first position. If the excess acceleration indicator 102 is still lit, then release of relay 118 will maintain the system in the coast mode of operation since coil 104 will still maintain relay 106 in its second position.

Referring to FIGURE 6, there is shown a detailed schematic diagram of the threshold detector used in the apparatus of FIGURES 3, 4, and 5. The three detectors 50, 52, and 54 of FIGURES 3 and 4, and 96, 98, and 100 of FIGURE 5 are identical units and function as follows.

The relay coil 58 of FIGURES 3 and 4 (104 of FIGURE 5), and the excess acceleration indicator 56 of FIGURES 3 and 4 (102 of FIGURE 5) are in the plate circuit of the output amplifier 138. Amplifier 138 is biased to cut off so as to be normally non-conducting. With no current in the amplifier, the potential across relay coil 58 and the indicator 56 is zero.

The input stages 140 and 142 comprise an amplifier with high forward gain and negative feedback to achieve a closed loop gain which will not appreciably vary with changing tube characteristics. A pair of reversed diodes 144 and 146 are connected in series to the grid of amplifier 138. Diode 144 has a zener (breakdown) voltage in excess of the peak saturated output of the amplifier 138, while diode 146 has a much lower zener voltage which is proportional to the desired threshold voltage for a particular target being tracked. With an input voltage to the threshold detector below the threshold value, the amplified signal is not sufficient to cause breakdown of either diode, current flow being prevented during half a cycle by diode 144 and during the other half cycle by diode 146. With zero current flow through the diodes, amplifier 138 remains biased to cut off.

With an input voltage to the detector in excess of the threshold value, the amplified signal is sufficient to cause the breakdown of diode 146 during the positive half cycle, and thus causes the grid of amplifier 138 to be driven positive, resulting in current flow through the coil 58 and indicator 56, at the same time charging capacitor 148. During the negative half cycle, conduction through the diodes is prevented by diode 144. However, capacitor 148 discharges at this time through resistor 150 to keep the grid of amplifier 138 positive and the plate conducting.

Referring to FIGURE 7, there is shown a schematic illustration of the effective limits of detection of the instant invention. It is apparent that a limiting condition of indication will be governed by the maximum allowable acceleration error for a maneuvering target. Thus, if we assume a maximum acceleration of 5g (taking "g" equal to 32.16 ft./sec.²) and an acceleration constant of 4 sec.⁻² for the generating system, then a cylindrical volume whose radius is $$\frac{\text{largest acceleration}}{\text{acceleration constant}} = \frac{5(32.16 \text{ ft./sec.}^2)}{4 \text{ sec.}^2} = 40.20 \text{ ft.}$$

can exist around the center line of the radar beam within which a second object cannot be detected. In other words, if the disturbing target falls within the cylindrical volume about the radar tracking line whose radius is 40.20 ft., the threshold detectors will not be activated since, in effect, the disturbing target has not exceeded the maximum acceleration capability for the target being tracked. Such a cylinder is illustrated schematically in FIGURE 7 by the numeral 152. A similar cylindrical volume may be determined for all possible targets to be tracked.

Since the radar beam can alternate between various parts of the target, a second limiting condition is imposed on the system by the effective radar length of the target being tracked. That is, if the predetermined threshold level does not account for the target length, it is possible for the radar beam to activate the threshold detectors when merely shifting from one spot on the target to another. If it be assumed for the purposes of explanation that the target length in the particular example calculated above is less than 40.20 ft., then the same cylindrical volume of no indication whose radius is 40.20 ft. will be large enough to take into account the length of the target. In accord with the above discussed limitations, it will be seen that in FIGURE 7, cylindrical volume 152 in which the appearance of a second target cannot be indicated while cone volume 154 presents that portion of the radar beam which will indicate the presence of another object.

There has thus been described a radar tracking system which is normal operation automatically changes the position of its antenna in response to an error signal representative of a change of acceleration of the target being tracked. Upon the presence of a second target within the range gate and width of the radar beam, the total acceleration error received by the system exceeds a predetermined magnitude established for the particular target being tracked; and by means of a novel threshold detector, the system is caused to drop out of its automatic tracking loop and operate either in response to an error signal generated during manual operation or in response to a zero acceleration error signal which causes the system to continually change the antenna at a rate of change corresponding to the target velocity immediately prior to activation of the threshold detector.

Although we have described our invention with a certain degree of particularity, it is understood that the present disclosure has been made only by way of example and that numerous changes in the examples of construction and the combination arrangement of parts may be resorted to without departing from the sphere and scope of the invention as hereinafter claimed.

The embodiments of the invention in which an exclusive privilege or property is claimed are defined as follows:

1. In an automatic radar tracking system, apparatus for indicating the presence of undesirable returns comprising:

an antenna, said antenna transmitting a radar beam having a predetermined range and width;

first means connected to said antenna for automatically producing an error signal representative of the acceleration of a target within the range and width of said radar beam;

and threshold means responsive to a predetermined magnitude of said error signal for providing an indication of the presence of another object within the range and width of said radar beam, said threshold means including output means normally biased so as to be non-operative and input means capable of overcoming the bias on said output means only when said error signal exceeds said predetermined magnitude.

2. The apparatus of claim 1 wherein said output means is an amplifier normally biased to cut off, and said input means comprises a pair of series connected reversed diodes connected to said amplifier and a capacitor connected between a point intermediate said diodes and said amplifier and a point of ground potential, one of said pair of diodes having a breakdown voltage in excess of the maximum output of said amplifier, the other of said diodes having a breakdown voltage corresponding to said predetermined magnitude of said error signal.

3. A radar tracking system comprising:
an antenna;
first means operatively connected to said antenna for automatically producing an error signal indicative of a change of position of a target being tracked;
second means responsive to said error signal for automatically changing the position of said antenna to correspond with the change of position of the target;
and third means responsive to a predetermined magnitude of said error signal for preventing said second means from automatically changing the position of said antenna in response to an error signal of greater magnitude than said predetermined magnitude.

4. The radar tracking system of claim 3 wherein said third means includes means for making said second means responsive to an error signal generated during manual operation of the tracking system.

5. The radar tracking system of claim 3 wherein said third means includes means for causing said second means to change the position of said antenna at a rate of change corresponding to the error signal produced by said first means immediately prior to activation of said third means.

6. A radar tracking system comprising:
an antenna;
first means operatively connected to said antenna for automatically producing an error signal representing the acceleration of a target being tracked;
second means responsive to said error signal for automatically changing the position of said antenna in accord with the acceleration of the target;
and third means responsive to a predetermined magnitude of acceleration for preventing said second means from automatically changing the position of said antenna in response to an acceleration of greater magnitude than said predetermined magnitude.

7. The radar tracking system of claim 6 wherein said third means includes an indicator responsive to said predetermined magnitude of acceleration, activation of said indicator providing a visual indication of the presence of another object in the vicinity of the target.

8. A radar tracking system comprising:
an antenna;
first means operatively connected to said antenna for automatically producing a first error signal representing the acceleration of a target being tracked;
second means responsive to said first error signal for automatically changing the position of said antenna in accord with the acceleration of the target, said second means including third means for selectively causing said second means to change the position of said antenna in response to a second error signal generated during manual operation of the tracking system; and
threshold means connected to said second means for monitoring the value of said first error signal, said threshold means being activated by a predetermined magnitude of said first error signal to actuate said third means and thereby cause said second means to become responsive to said second error signal.

9. The radar tracking system of claim 8 wherein said threshold means includes output means normally biased so as to be non-operative, and input means capable of overcoming the bias on said output means only when said first error signal exceeds said predetermined magnitude.

10. The radar tracking system of claim 9 wherein said output means is an amplifier normally biased so as to be non-conducting, and said input means comprises a pair of series connected reversed diodes connected to said amplifier and a capacitor connected between a point intermediate said diodes and said amplifier and a point of ground potential, one of said pair of diodes having a breakdown voltage in excess of the maximum output of said amplifier, the other of said diodes having a breakdown voltage corresponding to said predetermined magnitude of said first error signal.

11. The radar tracking system of claim 8 wherein said third means includes relay means movable between a first position wherein said second means receives said first error signal, and a second position, wherein said second means receives said second error signal.

12. The radar tracking system of claim 11 wherein said relay means includes actuating means, said actuating means being electrically connected to said threshold means, activation of said threshold means in response to the predetermined magnitude of said first error signal causing said actuating means to move said relay means from its first to its second position, thereby causing said second means to become responsive to said second error signal.

13. The radar tracking system of claim 12 wherein said relay means includes holding means for holding said relay means in its second position.

14. The radar tracking system of claim 13 wherein said holding means includes release means for releasing said holding means, actuation of said release means allowing said relay means to return to its first position if said first error signal is less than said predetermined magnitude.

15. The radar tracking system of claim 14 wherein said threshold means includes an indicator responsive to the predetermined magnitude of said first error signal, and said relay means includes an indicator responsive to said relay means being in its second position.

16. A radar tracking system comprising:
an antenna;
first means operatively connected to said antenna for automatically producing a first error signal representing the acceleration of a target being tracked;
second means responsive to said first error signal for automatically changing the position of said antenna in accord with the acceleration of the target;
threshold means connected to said second means for monitoring the value of said first error signal, said threshold means being activated by a predetermined magnitude of said first error signal;
said second means including third means responsive to activation of said threshold means for causing said second means to change the position of said antenna at a rate of change corresponding to the error signal produced by said first means immediately prior to activation of said threshold means.

17. The radar tracking system of claim 16 wherein said third means includes first relay means movable between a first position, wherein said second means receives said first error signal, and a second position, wherein said second means receives a zero acceleration error signal.

18. The radar tracking system of claim 17 wherein said first relay means includes first actuating means, said first actuating means being electrically connected to said threshold means, activation of said threshold means in response to the predetermined magnitude of said first error signal causing said first actuating means to move said first relay means from its first to its second position, thereby causing said second means to become responsive to said zero acceleration error signal.

19. The radar tracking system of claim 18 wherein said second means includes fourth means for causing said second means to change the position of said antenna in response to a second error signal generated during manual operation of the tracking system.

20. The radar tracking system of claim 19 wherein said fourth means includes holding means for holding said first relay means in its second position, and further includes second relay means movable from a first position, wherein said second means is responsive to said zero acceleration error signal, to a second position wherein said second means is responsive to said second error signal, said holding means maintaining said first relay in its second position only when said second relay means is in its second position.

21. The radar tracking system of claim 20 wherein said threshold means includes an indicator responsive to the predetermined magnitude of said first error signal; said holding means includes an indicator responsive to actuation thereof to indicate that said second means is receiving said second error signal; and said first and second relay means include an indicator responsive to said first relay means being in its second position and said second relay means being in its first position to indicate that said second means is receiving said zero acceleration error signal.

References Cited by the Examiner
UNITED STATES PATENTS
3,160,880    12/1964    Aires _____ 343—7.4

RODNEY D. BENNETT, *Primary Examiner.*

T. H. TUBBESING, *Assistant Examiner.*